US012655788B2

(12) United States Patent
Lei Ma et al.

(10) Patent No.: US 12,655,788 B2
(45) Date of Patent: Jun. 16, 2026

(54) STEAM INJECTED INTER-TURBINE BURNER ENGINE

(71) Applicant: RAYTHEON TECHNOLOGIES CORPORATION, Farmington, CT (US)

(72) Inventors: David Lei Ma, Avon, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 266 days.

(21) Appl. No.: 17/951,879

(22) Filed: Sep. 23, 2022

(65) Prior Publication Data

US 2024/0102416 A1      Mar. 28, 2024

(51) Int. Cl.
F02C 3/30 (2006.01)

(52) U.S. Cl.
CPC ............ F02C 3/30 (2013.01); *F05D 2220/32* (2013.01); *F05D 2240/35* (2013.01); *F05D 2270/08* (2013.01)

(58) Field of Classification Search
None
See application file for complete search history.

(56) References Cited

U.S. PATENT DOCUMENTS 4,272,953 A      6/1981  Rice
5,329,758 A  *  7/1994  Urbach ................. F01K 21/047
                                                         60/39.55

| 6,089,024 | A | 7/2000 | Hatanaka | |
|---|---|---|---|---|
| 7,254,951 | B2 | 8/2007 | Lockwood, Jr. | |
| 10,072,572 | B2 | 9/2018 | Razak | |
| 2009/0301054 | A1* | 12/2009 | Simpson | F02C 1/06 |
| | | | | 60/39.15 |
| 2010/0115960 | A1 | 5/2010 | Brautsch et al. | |
| 2019/0048748 | A1* | 2/2019 | Maier | F01K 23/10 |
| 2021/0207500 | A1* | 7/2021 | Klingels | F01K 23/10 |
| 2021/0262383 | A1* | 8/2021 | Uechi | F02C 6/18 |
| 2022/0243667 | A1 | 8/2022 | Rambo | |

OTHER PUBLICATIONS

European Search Report for European Application No. 23199523.4 mailed Feb. 19, 2024.

* cited by examiner

*Primary Examiner* — Phutthiwat Wongwian

*Assistant Examiner* — Jacek Lisowski

(74) *Attorney, Agent, or Firm* — Carlson, Gaskey & Olds, P.C.

(57)                    ABSTRACT

A turbine engine assembly includes a turbine section including at plurality of turbine stages through which the gas flow expands to generate a mechanical power output. An inter-turbine burner between at least two of the plurality of turbine stages reheats the gas flow. A condenser extracts water from the gas flow exhausted from the turbine section, and an evaporator heats the water extracted by the condenser to generate a steam flow with the steam flow communicated to the inter-turbine burner and added to the gas flow expanded through the turbine section.

14 Claims, 2 Drawing Sheets

STEAM INJECTED INTER-TURBINE BURNER ENGINE

TECHNICAL FIELD

The present disclosure relates generally to a turbine engine including an inter-turbine burner reheating an exhaust gas flow and a water recovery system generating a steam flow that is injected into the gas flow to increase work output.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine.

Turbine engine manufacturers continue to seek further improvements to engine performance including improvements to reduce environmental impact while improving thermal and propulsive efficiencies.

SUMMARY

A turbine engine assembly according to an example disclosed embodiment, includes, among other possible things, a compressor section in which an inlet airflow is compressed, a combustor section where compressed airflow from the compressor section is mixed with fuel and ignited to generate a gas flow, a turbine section including a plurality of turbine stages through which the gas flow expands to generate a mechanical power output, an inter-turbine burner where the gas flow between at least two of the plurality of turbine stages is reheated, a condenser where water is extracted from the gas flow exhausted from the turbine section, and an evaporator where water extracted by the condenser is heated to generate a steam flow with the steam flow communicated to the inter-turbine burner and added to the gas flow expanded through the turbine section.

In a further embodiment of the foregoing turbine engine assembly, the plurality of turbine stages is distributed between a high pressure turbine section and a power turbine section and the inter-turbine burner is disposed axially between the high pressure turbine section and the power turbine section.

In a further embodiment of any of the foregoing turbine engine assemblies, a portion of the steam flow is communicated to the combustor section and added to the gas flow generated in the combustor section.

A further embodiment of any of the foregoing turbine engine assemblies includes a pump where water extracted from the gas flow is pressurized and communicated to the evaporator.

In a further embodiment of any of the foregoing turbine engine assemblies, a water storage tank where water extracted by the condenser is stored prior to being pressurized by the pump and communicated to the evaporator.

In a further embodiment of any of the foregoing turbine engine assemblies, the evaporator provides thermal communication between the exhaust gas flow and a water flow extracted by the condenser.

In a further embodiment of any of the foregoing turbine engine assemblies, the evaporator is disposed aft of the turbine section.

In a further embodiment of any of the foregoing turbine engine assemblies, the condenser is disposed aft of the evaporator.

In a further embodiment of any of the foregoing turbine engine assemblies, a portion of the inlet airflow is communicated to the condenser wherein the inlet airflow cools the exhaust gas flow.

In a further embodiment of any of the foregoing turbine engine assemblies, the inter-turbine burner receives a fuel flow that is mixed with the exhaust gas flow and ignited to generate a reheated gas flow that is communicated through at least one of the plurality of turbine stages.

In a further embodiment of any of the foregoing turbine engine assemblies, the inter-turbine burner comprises a different power output capacity than the combustor section.

Another disclosed turbine engine assembly embodiment, includes, among other possible things, a compressor section in which an inlet airflow is compressed, a combustor section where compressed airflow from the compressor section is mixed with fuel and ignited to generate a gas flow, a first turbine section through which the gas flow expands to generate power, an inter-turbine burner where the gas flow exhausted from the first turbine section is mixed with fuel and ignited to generate a reheated gas flow, a second turbine section through which the reheated gas flow expands to generate power, a condenser where water is extracted from the gas flow exhausted from the turbine section, and an evaporator where water extracted by the condenser is heated to generate a steam flow with the steam flow communicated to the combustor and the inter-turbine burner and added to the gas flow expanded through the turbine section.

A further embodiment of the foregoing turbine engine assembly includes a pump where water extracted from the gas flow is pressurized and communicated to the evaporator.

In a further embodiment of any of the foregoing turbine engine assemblies, the evaporator is disposed aft of the second turbine section.

In a further embodiment of any of the foregoing turbine engine assemblies, the condenser is disposed aft of the evaporator.

In a further embodiment of any of the foregoing turbine engine assemblies, a portion of the inlet airflow is communicated to the condenser to cool the exhaust gas flow.

A method of operating a turbine engine according to another disclosed example embodiment, includes, among other possible things, compressing an inlet airflow in a compressor section, generating a gas flow by igniting a mixture of the compressed inlet airflow and fuel within a combustor section, generating a power output by expanding the gas flow through a first turbine section, generating a reheated gas flow by igniting a mixture of exhaust gases from the first turbine section and fuel within an inter-turbine burner, generating an additional power output by expanding the reheated gas flow through a second turbine section, extracting water from the reheated exhaust gas flow in a condenser, generating a steam flow by heating the extracted water in an evaporator, and injecting the steam flow into the inter-turbine burner to be expanded through the second turbine section with the reheated gas flow.

In a further embodiment of the foregoing method, a portion of the steam flow is communicated to the combustor section and added to the gas flow generated in the combustor section.

In a further embodiment of the foregoing method, the condenser is downstream from the evaporator and the reheated exhaust gas flow is cooled with a portion of the inlet airflow within the condenser.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
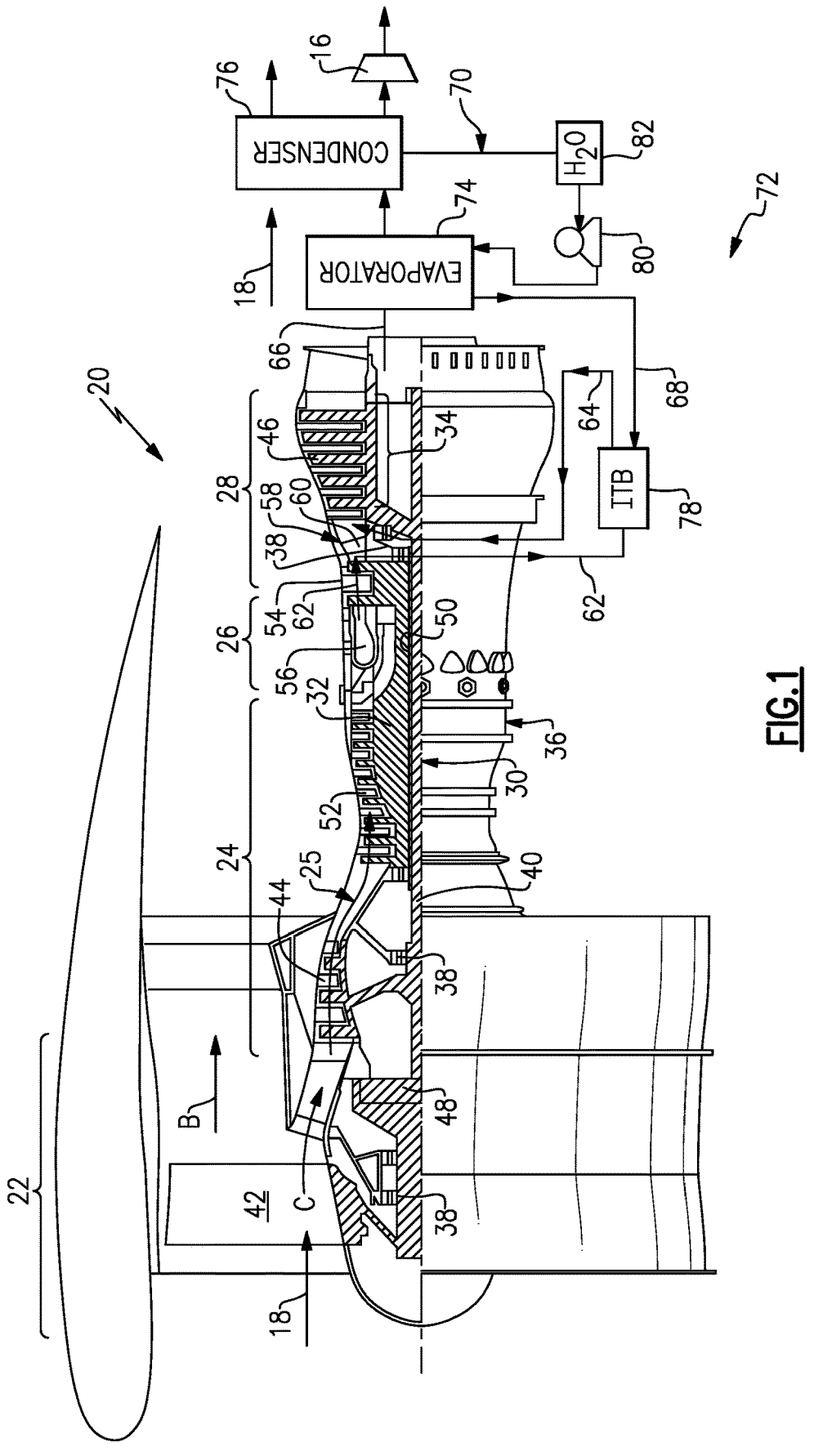
FIG. 1 is a schematic view of an example turbine engine embodiment.

FIG. 1 schematically illustrates an example turbine engine 20 with a water recovery system 72 and an inter-turbine burner 78 where core flow gases are reheated. A steam flow is generated from water recovered from the exhaust gas flow and is combined with a reheated gas flow in the inter-turbine burner 78 to increase power output from the turbine section.

The engine 20 includes a fan section 22, a compressor section 24, a combustor section 26 and the turbine section 28. The fan section 22 drives inlet airflow 18 along a bypass flow path B, while the compressor section 24 draws air in along a core flow path C where a core airflow 25 is compressed and communicated to a combustor section 26. In the combustor section 26, compressed air is mixed with fuel and ignited to generate the high energy combusted gas flow 62 that expands through the turbine section 28 where energy is extracted and utilized to drive the fan section 22 and the compressor section 24.

Although the disclosed non-limiting embodiment depicts a two-spool turbofan turbine engine, it should be understood that the concepts described herein are not limited to use with two-spool turbofans as the teachings may be applied to other types of turbine engines. For example, a turbine engine including a three-spool architecture in which three spools concentrically rotate about a common axis and where a low spool enables a low-pressure turbine to drive a fan via a gearbox, an intermediate spool that enables an intermediate pressure turbine to drive a first compressor of the compressor section, and a high spool that enables a high-pressure turbine to drive a high-pressure compressor of the compressor section. Additionally, the features of this disclosure may be applied to other engine configurations utilized to generate shaft power.

The example engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

The low-speed spool 30 generally includes an inner shaft 40 that connects a fan 42 and a low-pressure (or first) compressor section 44 to a low-pressure (or first) turbine section 46. The inner shaft 40 drives the fan section 22 through a speed change device, such as a geared architecture 48, to drive the fan section 22 at a lower speed than the low-speed spool 30. The high-speed spool 32 includes an outer shaft 50 that interconnects a high-pressure (or second) compressor section 52 and a high-pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high-pressure" compressor or turbine experiences a higher pressure than a corresponding "low-pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low-pressure turbine 46.

The core airflow 25 through the core airflow path C is compressed by the low-pressure compressor 44 then by the high-pressure compressor 52 mixed with fuel and ignited in the combustor 56 to produce the high energy hot combusted gas flow 62 that is expanded through the high-pressure turbine 54 and low-pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the turbine engine 20 is increased and a higher power density may be achieved.

The disclosed turbine engine 20 in one example is a high-bypass geared aircraft engine. In a further example, the turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the turbine engine 20 includes a bypass ratio greater than about ten (10:1) and the fan diameter is significantly larger than an outer diameter of the low-pressure compressor 44. It should be understood, however, that the above parameters are only exemplary of one embodiment of a turbine engine including a geared architecture and that the present disclosure is applicable to other turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of [(Tram ° R)/(518.7° R)]0.5. The "Low corrected fan tip speed", as disclosed herein according to one non-limiting embodiment, is less than about 1150 ft/second.

The example turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low-pressure turbine 46 includes no more than about 6 turbine rotors schematically indicated at 34. In another non-limiting example embodiment, the low-pressure turbine 46 includes about 3 turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 disclose an example turbine engine 20 with increased power transfer efficiency.

The example engine 20 includes a water recovery system 72 including a condenser 76 that cools an exhaust gas flow 66 with ram inlet air 18 to recover water 70. Water recovered from the exhaust gas flow 66 is accumulated in a storage tank 82 and pressurized in a pump 80 before being vaporized in an evaporator 74 and injected as a steam flow 68 into the inter-turbine burner 78.

The inter-turbine burner 78 is disposed between at least two of a plurality of turbine stages of the turbine section 28. In the inter-turbine burner 78, the gas flow 62 is mixed with additional fuel and ignited to generated a reheated gas flow 64. The reheated gas flow 64 and the steam flow 68 are combined and expanded through additional turbine sections to produce power.

Figures 2, 3:
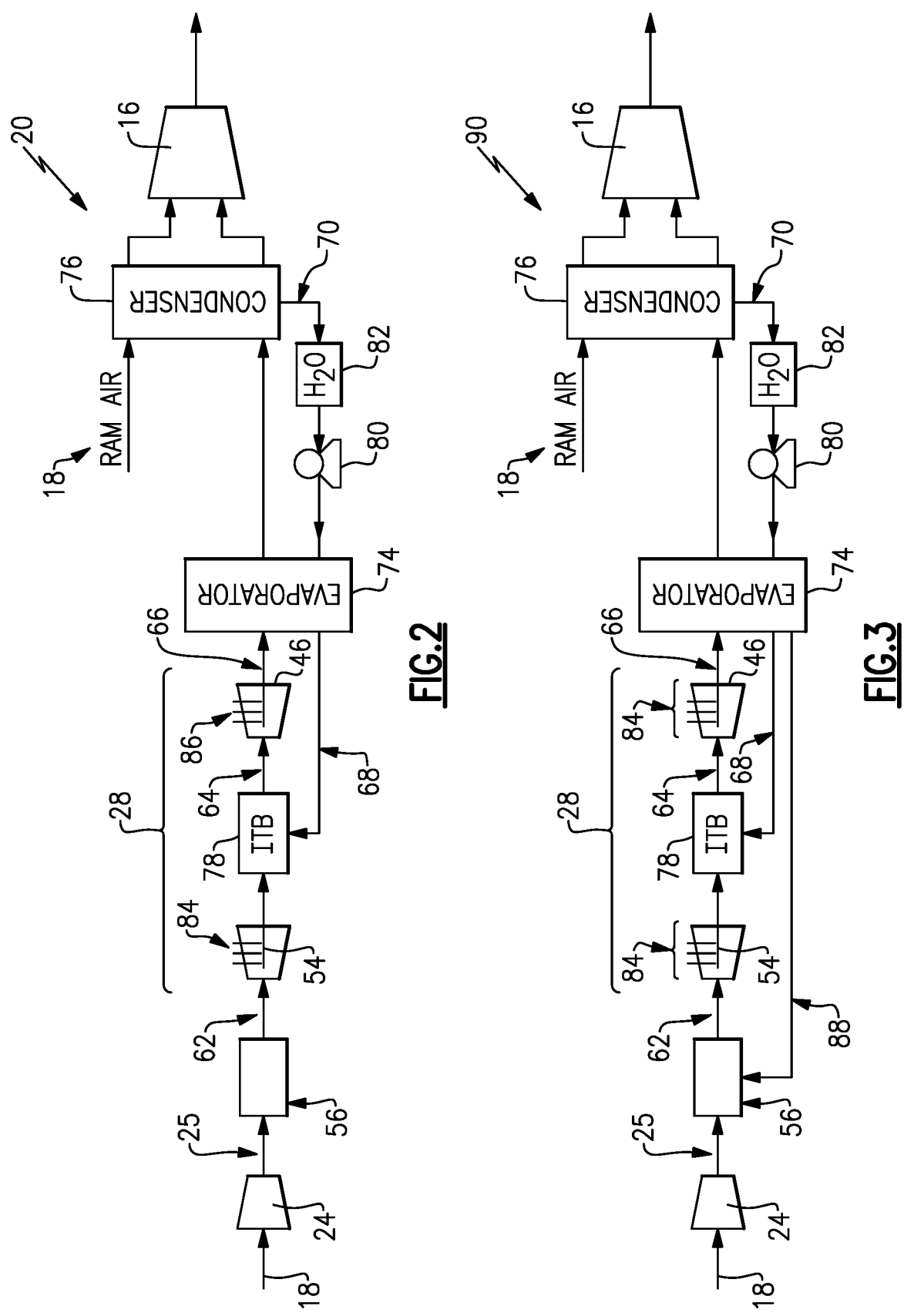
FIG. 2 is a simplified schematic view of the example turbine engine embodiment of FIG. 1.
FIG. 3 is a schematic view of another example turbine engine embodiment.

Referring to FIG. 2 with continued reference to FIG. 1, a simplified schematic view of an example turbine engine 20 is shown and includes the water recovery system 72 and the inter-turbine burner 78. The compressor section 24 is shown schematically and may include the low pressure compressor section 44 and the high pressure compressor section 52 or a combination of other compressor sections.

The turbine section 28 includes a first group of turbine stages 84 and a second group of turbine stages 86. In one disclosed example, the first group of turbine stages 84 is embodied as a high pressure turbine 54 and the second group of turbine stages 86 is embodied as a low pressure turbine 46. The low pressure turbine 46 may also referred to as a power turbine within this disclosure. The first group of turbine stages 84 may include at least one turbine stage or may include a plurality of turbine stages. The second group of turbine stages 86 includes at least one turbine stage or a plurality of turbine stages. The first group of turbine stages 84 and the second group of turbine stages 86 may be embodied as turbine stages grouped as part of one or more turbine sections and remain within the scope and contemplation of this disclosure.

An inter-turbine burner 78 is disposed axially between the first number of turbine stages 84 and the second plurality of turbine stages. The inter-turbine burner 78 receives the gas flow 62 after expansion through the first group of turbine stages 84. The inter-turbine burner 78 is where a reheated gas flow 64 is generated by igniting a mixture of the partially expanded gas flow 62 from the first group of turbine stages 84 and fuel. The example inter-turbine burner 78 is of a different power output capacity than the combustor 56. In one disclosed example, the inter-turbine burner 78 is of a lesser power output capacity than the combustor 56. However, the combustor 56 and inter-turbine burner 78 may have the same power output capacity. Moreover, the addition of the inter-turbine burner 78 may provide for a decrease in power output capacity of the combustor 56.

The reheated gas flow 64 is of an increased pressure and temperature to provide an increase in power as compared to the gas flow exhausted from the first group of turbine stages 84. The reheated gas flow 64 expands through the power turbine 46 to generate power to drive portions of the compressor section 24 and the fan section 22.

A gas flow 66 exhausted from the power turbine 46 is communicated to the evaporator 74 to heat the water 70. The pump 80 pressurizes the water 70 to a pressure corresponding with pressures within the inter-turbine burner 78. The heat transferred from the exhaust gas flow 66 to the water 70 in the evaporator 74, vaporizes the water to generate the steam flow 68. The steam flow 68 is injected back into the turbine section 28 and combined with the reheated gas flow 64. The combined steam flow 68 and reheated gas flow 64 are expanded through the second plurality of turbine stages 86 provided as the power turbine 46.

The injected steam flow 68 increases the amount of work that can be produced in the power turbine 46 without increasing the amount of fuel utilized to generate the gas flows 62 and 64. Waste heat in the form of the exhaust gas flow 66 is recovered in the form of the steam flow 68 and added back in the turbine section 28.

In one disclosed embodiment, the steam flow 68 is injected into the inter-turbine burner 78 and combined with the reheated gas flow 64. However, the steam flow 68 may be injected upstream of the inter-turbine burner 78 and downstream of the first plurality of turbine stages 78. The steam flow 68 may also be injected just downstream of the inter-turbine burner 78 and prior to the second plurality of turbine stages 86.

In one disclosed example embodiment, the high pressure turbine section 54 includes the first group of turbine stages 84 and the power turbine 46 includes the second group of turbine stages 86. The high pressure turbine section includes at least one turbine stage and the power turbine 46 includes between 3 and 6 turbine stages. The number of stages in each turbine section 54, 46 may vary depending on engine specific desired performance and are within the scope and contemplation of this disclosure.

Referring to FIG. 3, another turbine engine configuration is schematically shown and indicated at 90. The turbine engine 90 includes the same features as the example turbine engine 20 with the addition of communication of a portion of the steam flow to the combustor 56. In the example engine embodiment 90, a portion of the steam flow 88 is communicated to the combustor 56 and mixed with the gas flow 62. The mixture of steam flow and gas flow 62 are communicated to the first turbine section.

In this example embodiment, the pump 80 elevates the pressure of the steam flow 88 to a pressure compatible with the combustor 56. The steam flow 88 and gas flow 62 are than communicated to the first group of turbine stages 84 where it is expanded to generate power. The exhausted gas flow 62 is then reheated in the inter-turbine burner 78, again mixed with a steam flow 68 and expanded through the second group of turbine stages 86.

The example engine embodiments recover energy otherwise lost as waste heat in the form of an injected steam flow and reheating of exhaust gas flow to increase power output of the turbine section.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
a compressor section in which an inlet airflow is compressed;
a combustor section where compressed airflow from the compressor section is mixed with fuel and ignited to generate a gas flow;
a turbine section including a plurality of turbine stages through which the gas flow expands to generate a mechanical power output;
an inter-turbine burner where the gas flow between at least two of the plurality of turbine stages is reheated;
a condenser where water is extracted from the gas flow exhausted from the turbine section; and
an evaporator where water extracted by the condenser is heated to generate a steam flow with the steam flow communicated to the inter-turbine burner and added to the gas flow expanded through the turbine section.

2. The turbine engine assembly as recited in claim 1, wherein the plurality of turbine stages is distributed between a high pressure turbine section and a power turbine section and the inter-turbine burner is disposed axially between the high pressure turbine section and the power turbine section.

3. The turbine engine assembly as recited in claim 1, wherein a portion of the steam flow is communicated to the combustor section and added to the gas flow generated in the combustor section.

4. The turbine engine assembly as recited in claim 1, including a pump where water extracted from the exhaust gas flow is pressurized and communicated to the evaporator.

5. The turbine engine assembly as recited in claim 4, including a water storage tank where water extracted from the condenser is stored prior to being pressurized by the pump and communicated to the evaporator.

6. The turbine engine assembly as recited in claim 1, wherein the evaporator provides thermal communication between the exhaust gas flow and a water flow extracted by the condenser.

7. The turbine engine assembly as recited in claim 6, wherein the evaporator is disposed aft of the turbine section.

8. The turbine engine assembly as recited in claim 7, wherein the condenser is disposed aft of the evaporator.

9. The turbine engine assembly as recited in claim 1, wherein a portion of the inlet airflow is communicated to the condenser wherein the inlet airflow cools the exhaust gas flow.

10. The turbine engine assembly as recited in claim 1, wherein the inter-turbine burner receives a fuel flow that is mixed with the exhaust gas flow and ignited to generate a reheated exhaust gas flow that is communicated through at least one of the plurality of turbine stages.

11. The turbine engine assembly as recited in claim 10, wherein the inter-turbine burner comprises a different power output capacity than the combustor section.

12. A method of operating a turbine engine comprising:
compressing an inlet airflow in a compressor section;
generating a gas flow by igniting a mixture of the compressed inlet airflow and fuel within a combustor section;
generating a power output by expanding the gas flow through a first turbine section;
generating a reheated gas flow by igniting a mixture of exhaust gases from the first turbine section and fuel within an inter-turbine burner;
generating an additional power output by expanding the reheated gas flow through a second turbine section;
extracting water from the reheated exhaust gas flow in a condenser;
generating a steam flow by heating the extracted water in an evaporator; and
injecting the steam flow into the inter-turbine burner to be expanded through the second turbine section with the reheated gas flow.

13. The method as recited in claim 12, wherein a portion of the steam flow is communicated to the combustor section and added to the gas flow generated in the combustor section.

14. The method as recited in claim 13, wherein the condenser is downstream from the evaporator and the reheated exhaust gas flow is cooled with a portion of the inlet airflow within the condenser.

* * * * *